(12) United States Patent
Kaushik et al.

(10) Patent No.: US 11,170,568 B2
(45) Date of Patent: Nov. 9, 2021

(54) PHOTO-REALISTIC IMAGE GENERATION USING GEO-SPECIFIC DATA

(71) Applicant: Rockwell Collins, Inc., Cedar Rapids, IA (US)

(72) Inventors: Rishabh Kaushik, Salt Lake City, UT (US); Daniel Lowe, Sandy, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/750,894

(22) Filed: Jan. 23, 2020

(65) Prior Publication Data

US 2021/0233306 A1    Jul. 29, 2021

(51) Int. Cl.
*G06T 17/05* (2011.01)
*G06F 16/29* (2019.01)
*G06N 3/08* (2006.01)

(52) U.S. Cl.
CPC .............. *G06T 17/05* (2013.01); *G06F 16/29* (2019.01); *G06N 3/08* (2013.01)

(58) Field of Classification Search
CPC . G06T 17/05; G06T 1/20; G06T 2207/10028; G06T 15/205; G06T 19/003; G06T 11/00; G06T 2207/20081; G06T 19/20; G06T 7/11; G06T 15/005; G06T 3/4038; G06F 16/29; G06N 3/08; G06N 3/008; G06N 3/02; G08G 5/0021; G08G 5/025; G08G 5/0069

See application file for complete search history.

(56) References Cited

U.S. PATENT DOCUMENTS

| | | |
|---|---|---|
| 5,255,211 A | 10/1993 | Redmond |
| 5,359,526 A | 10/1994 | Whittington et al. |
| 5,748,867 A | 5/1998 | Cosman et al. |
| 7,310,616 B2 | 12/2007 | Nemethy et al. |
| 7,366,736 B1 | 4/2008 | Woodard |
| 8,466,915 B1 | 6/2013 | Frueh |
| 8,831,283 B1 * | 9/2014 | McLaughlin ......... H04W 16/18 382/103 |
| 9,171,402 B1 * | 10/2015 | Allen ..................... G06T 15/20 |
| 9,245,378 B1 | 1/2016 | Villagomez et al. |
| 9,805,496 B2 | 10/2017 | Mitchell et al. |
| 2003/0023416 A1 * | 1/2003 | Peterson ................ G16H 50/80 703/2 |
| 2006/0172264 A1 | 8/2006 | Eskew et al. |

(Continued)

OTHER PUBLICATIONS

Isola, Phillip et al., "Image-to-Image Translation with Conditional Adversarial Networks", Berkeley AI Research (BAIR) Laboratory, UC Berkeley, Nov. 26, 2018, 17 pages.

*Primary Examiner* — Xilin Guo
(74) *Attorney, Agent, or Firm* — Suiter Swantz pc llo

(57) ABSTRACT

A system may include a display and a processor communicatively coupled to the display. The processor may be implemented as a neural network. The processor may be configured to: receive image data associated with a location; receive geo-specific data associated with the location; use the image data and the geo-specific data to generate a photo-realistic image, wherein the photo-realistic image contains photo-typical content in geographically correct locations, wherein the photo-typical content appears typical for the location based at least on the geo-specific data; and output the photo-realistic image to the display for presentation to a user.

16 Claims, 4 Drawing Sheets

(56) References Cited

U.S. PATENT DOCUMENTS

| | | | |
|---|---|---|---|
| 2007/0237420 A1* | 10/2007 | Steedly | G06T 3/4038 |
| | | | 382/284 |
| 2012/0256919 A1 | 10/2012 | Ingersoll et al. | |
| 2014/0267723 A1* | 9/2014 | Davidson, Jr. | G01C 11/02 |
| | | | 348/147 |
| 2019/0204189 A1* | 7/2019 | Mohr, Jr. | G05D 1/0646 |
| 2019/0228571 A1 | 7/2019 | Atsmon | |
| 2019/0302290 A1* | 10/2019 | Alwon | G01V 1/364 |
| 2020/0074266 A1* | 3/2020 | Peake | G06K 9/6256 |
| 2020/0167059 A1* | 5/2020 | Luckey | G06T 15/20 |
| 2020/0209858 A1* | 7/2020 | Trofymov | G06N 3/08 |

* cited by examiner

PHOTO-REALISTIC IMAGE GENERATION USING GEO-SPECIFIC DATA

BACKGROUND

In a simulation and training environment, data content that represents the world in the 3D whole Earth model may have issues with smooth blending between types of terrain textures and repetitiveness of a single type of terrain texture if the terrain extends for a significant distance in a visual scene.

SUMMARY

In one aspect, embodiments of the inventive concepts disclosed herein are directed to a system. The system may include a display and a processor communicatively coupled to the display. The processor may be implemented as a neural network. The processor may be configured to: receive image data associated with a location; receive geo-specific data associated with the location; use the image data and the geo-specific data to generate a photo-realistic image, wherein the photo-realistic image contains photo-typical content in geographically correct locations, wherein the photo-typical content appears typical for the location based at least on the geo-specific data; and output the photo-realistic image to the display for presentation to a user.

In a further aspect, embodiments of the inventive concepts disclosed herein are directed to a method. The method may include: receiving, by at least one processor, image data associated with a location, wherein the at least one processor is implemented as a neural network, wherein the at least one processor is communicatively coupled to a display; receiving, by the at least one processor, geo-specific data associated with the location; using, by the at least one processor, the image data and the geo-specific data to generate a photo-realistic image, wherein the photo-realistic image contains photo-typical content in geographically correct locations, wherein the photo-typical content appears typical for the location based at least on the geo-specific data; and outputting, by the at least one processor, the photo-realistic image to the display for presentation to a user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
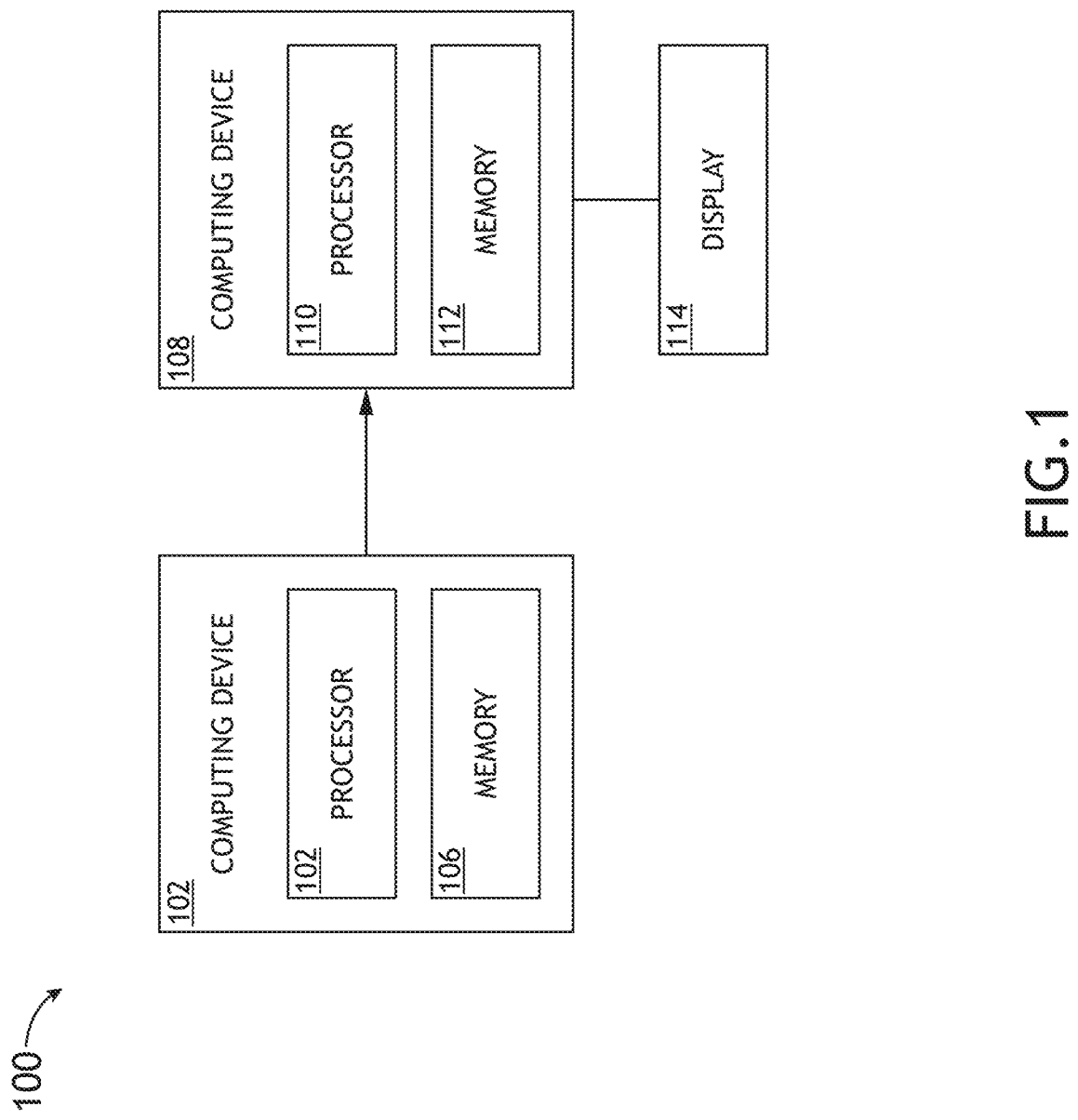
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system configured to use image data and geo-specific data to generate a photo-realistic image.

Some embodiments may generate photorealistic content for given land types. Some embodiments may use any suitable neural network (e.g., a conditional generative adversarial network (cGAN)) to generate photorealistic content. For example, the neural network may be trained using an image combination pipeline including geo-specific data (e.g., land type data, elevation data, and/or vector data) and actual image data in a generative adversarial environment. Based on the features and patterns learned during the training, the generator part of the neural network may render specific land-use content (e.g., buildings and/or trees) with typical orientation and position (e.g., buildings near and facing roads and/or trees not on roads) at runtime. The technique may generate photorealistic texture between different land types and may avoid any repeating pattern issues that emerge from traditional algorithmic approaches. Some embodiments save storage and costs compared to covering the world with photographic texture and may look better than a theme-based approach, which can have issues with transitioning realistically between different land types, therefore giving a huge return-on-investment.

In some embodiments, texture generation may involve generating textures for the entire world and displaying the textures in a simulator as needed to create a representative scene for the trainee at the area of the world the trainee is located. Some embodiments may use a neural network to generate photo-realistic geo-typical textures with proper level of detail (LOD) for the entire world for use in the simulator. To accomplish this, the neural network may be trained with photo specific images, elevation data, ground type identification data, and other data. The simulator may use the world location of the trainee to retrieve and display the appropriate texture generated by the neural network.

Some embodiment may utilize deep learning neural networks, which need to be trained before the neural networks can be utilized. The training typically uses significant amounts of training data and many hours of computational time. After the network is trained, the network can execute very quickly (e.g., in milliseconds) to produce photo-realistic content. Some embodiments may utilize a cGAN. cGANs are well known in the art. For example, cGANs and use of the Pix2Pix algorithm are explained in more detail in "Image-to-Image Translation with Conditional Adversarial Networks", Berkeley AI Research (BAIR) Laboratory, UC Berkeley, by Phillip Isola et al., Nov. 26, 2018, which is incorporated herein by reference in its entirety.

Some embodiments may have multiple benefits, such as photo-quality texture that is otherwise unachievable with current technology, significant reduction in data size (e.g., from 2 Terabytes (Tb) to 500 Megabytes (Mb)), the ability to capture changes to cities, airports, roadways, etc. with no manual intervention, and money savings. Additionally, in some embodiments, all changes may be captured for free in open source data. Some embodiments may replace the need for customers to use expensive photographic imagery for ground texture, whereas, previously, customers had to choose where to place expensive photographic insets within a whole world theme-based approach. Some embodiments may render more realistic texture, over more area, than existing approaches. Some embodiments may eliminate expensive manual processes, which may: reduce the need for custom textures, which are expensive to develop; eliminate the huge manual effort required to generate ground texture themes via traditional algorithmic approaches; and/or support run-time-publishing so data can be updated and rendered immediately rather than via a costly and time-consuming offline process. Some embodiments may substantially improve realism while lowering the cost of generating terrain texture content on the fly for the entire Earth.

Referring now to FIG. 1, an exemplary embodiment of a system 100 according to the inventive concepts disclosed herein is depicted. The system 100 may be implemented as any suitable system, such as a vehicular system (e.g., an aircraft system; e.g., including least one aircraft, at least one watercraft, at least one submersible craft, at least one automobile, and/or at least one train) and/or a multiple computing device system. For example, as shown in FIG. 1, the system 100 may include at least one computing device 102, at least one computing device 108, and/or at least one display 114, some or all of which may be communicatively coupled at any given time.

The computing device 102 may include at least one processor 104 and at least one computer readable medium (e.g., memory 106), some or all of which may be communicatively coupled at any given time. The at least one processor 104 may be implemented as any suitable type and number of processors. For example, the at least one processor 104 may include at least one general purpose processor (e.g., at least one central processing unit (CPU)), at least one graphics processing unit (GPU), and/or at least one field-programmable gate array (FPGA). The at least one processor 104 may be configured to perform (e.g., collectively perform if more than one processor) any or all of the operations disclosed throughout. For example, the at least one processor 104 may be configured to train a neural network (e.g., a cGAN) and provide weights and biases to the computing device 108.

The computing device 108 may include at least one processor 110 and at least one computer readable medium (e.g., memory 112), some or all of which may be communicatively coupled at any given time. The at least one processor 110 may be implemented as any suitable type and number of processors. For example, the at least one processor 110 may include at least one general purpose processor (e.g., at least one CPU), at least one GPU, and/or at least one FPGA. The at least one processor 110 may be implemented as a neural network (e.g., a cGAN). The at least one processor 110 may be configured to perform (e.g., collectively perform if more than one processor) any or all of the operations disclosed throughout. For example, the at least one processor 110 may be configured to: receive image data associated with a location; receive geo-specific data associated with the location; use the image data and the geo-specific data to generate a photo-realistic image (e.g., a top-down photo-realistic image), wherein the photo-realistic image contains photo-typical content in geographically correct locations, wherein the photo-typical content appears typical for the location based at least on the geo-specific data; and output the photo-realistic image to the display 114 for presentation to a user. The neural network may use multiple channels of input data including at least one channel for the image data (e.g., three channels for each of red, green, and blue and/or one channel for grayscale) and at least one channel for the geo-specific data. For example, the geo-specific data may include at least one of: geographical information data (e.g., pertaining to roads, waterways, buildings, etc.), elevation data (e.g., pertaining to terrain slope derived from elevation grid posts), ecological data (e.g., pertaining to what type of land, such as dessert, mountain, forest, etc.), near-infrared data (e.g., to identify foliage), land-use data (e.g., how does the land get used, such as industry, urban, farm, etc.), and/or target photo pixel resolution data.

Figure 2:
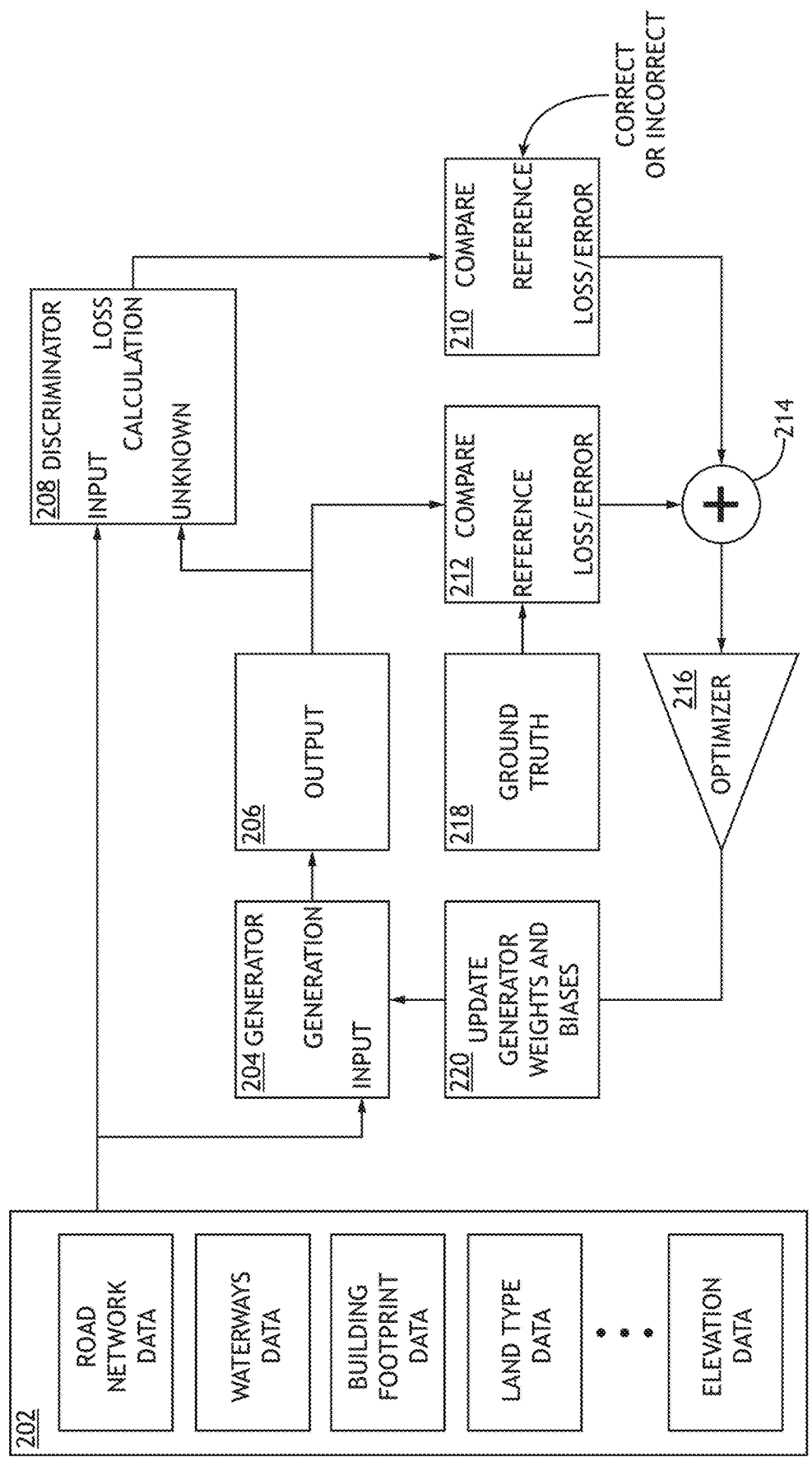
FIG. 2 is an exemplary diagram of at least one processor of FIG. 1 implemented as a neural network of an exemplary embodiment according to the inventive concepts disclosed herein.

Referring now to FIG. 2, an exemplary diagram of the at least one processor 110 implemented as a neural network (e.g., a cGAN) of an exemplary embodiment according to the inventive concepts disclosed herein is depicted. The neural network may include and/or utilize geo-specific data 202 and image data, at least one generator 204, at least one output 206, at least one discriminator 208, at least one comparator 210, at least one comparator 212, at least one summer 214, at least one optimizer 216, at least one desired output (e.g., ground truth 218), and/or at least one update generator 220 for updating weights and biases. For example, the generator 204 may use the image data, the geo-specific data, and a set of weights and biases to iteratively generate an output image 206. For example, the discriminator 208 may iteratively generate a loss function to measure how good the generator's output image 206 is, and the discriminator 208 may iteratively update the set of weights and biases until the discriminator 208 determines the output image to be real, wherein the output image 206 determined to be real is the photo-realistic image.

Still referring to FIG. 2, the generator 204 (e.g., a generator network) may take the input and a set of weights and bias to generate an output 206. The discriminator 208 (e.g., discriminator network) may be shown the input and the desired output (e.g., ground truth 218). Therefore, the discriminator 208 may generate a loss function to measure how good the generator's 204 output 206 is. The generator 204 may iterate with different weights and bias to generate different outputs 206. These outputs 206 may be measured by the discriminator 208 so that the generator 204 can save the weights and bias that generated better results. This iteration can continue until the generator 204 is producing an output 206 that the discriminator 208 thinks (e.g., determines) is real. Typically the input is in the form of color pictures. The color pictures contain three color values per pixel (red green blue (RGB)) or three channels of data. If processing a grayscale picture, there would only be a need for one channel. The neural network may be effectively modified to accept more than 3 channels of data so that data can be used to describe the location on the Earth with enough information to generate a typical representation. The data may contain information about road placement, elevation, ecological information, etc. This data may be paired with actual satellite photos so the cGAN can learn how to render photo-realistic typical content for any location on the Earth that the cGAN is trained for. Data is available for the whole Earth. Some embodiments may use this cGAN deep learning technology for producing typical top-down photo-realistic images that can be used in lieu of actual photographic images or other theme-based solutions. Some embodiments provide a way to generate photo-typical content that may contain content (e.g., roads, buildings, vegetation, etc.) in geographically correct locations but be rendered with typical looking content. Some embodiments may be configured to generate photo-realistic terrain for any location on Earth.

Figure 3:
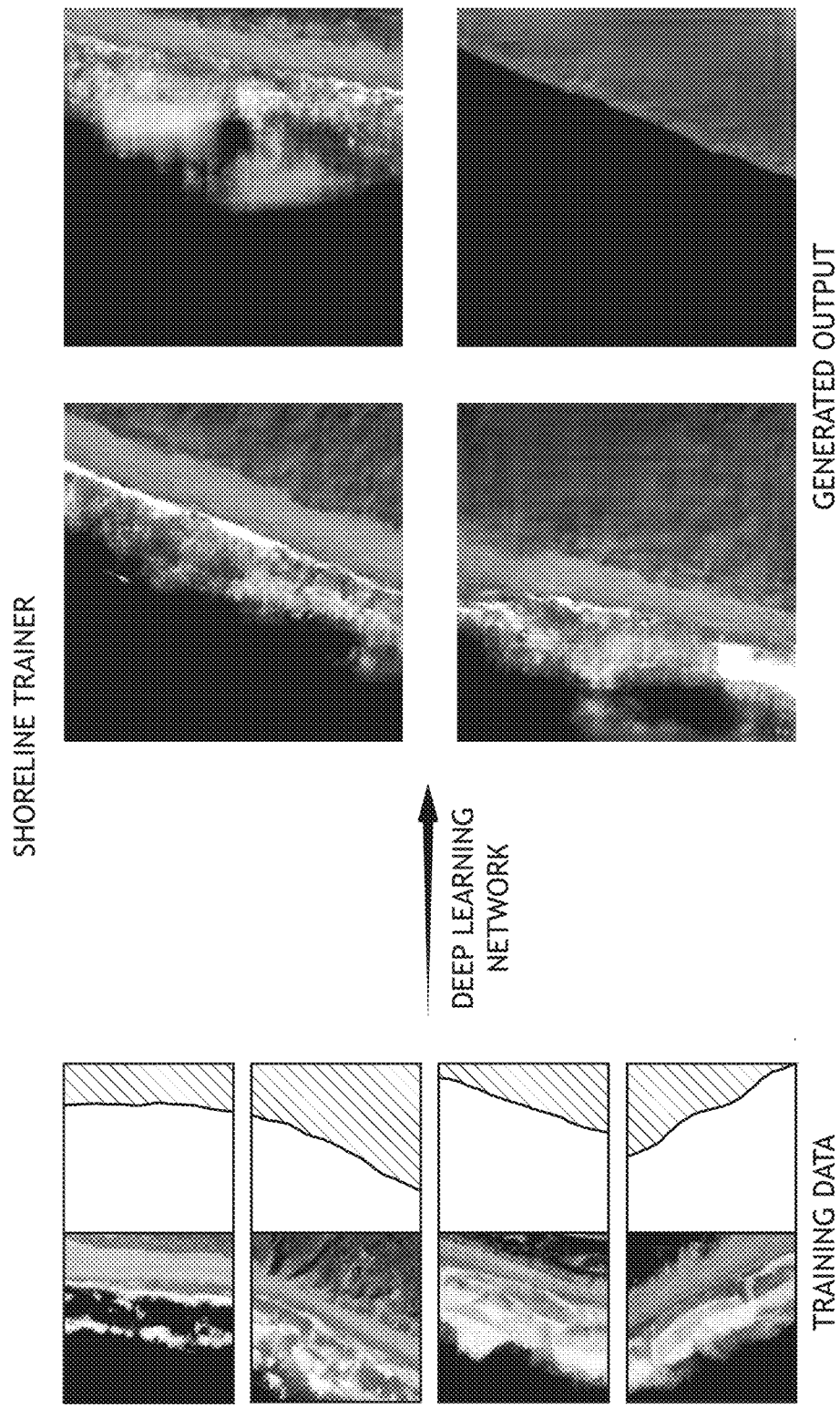
FIG. 3 shows exemplary training data and generated output (e.g., photo-realistic images) of some embodiments according to the inventive concepts disclosed herein.

FIG. 3 shows exemplary training data and generated output (e.g., photo-realistic images (e.g., top-down photo-realistic images)) of some embodiments according to the inventive concepts disclosed herein.

Figure 4:
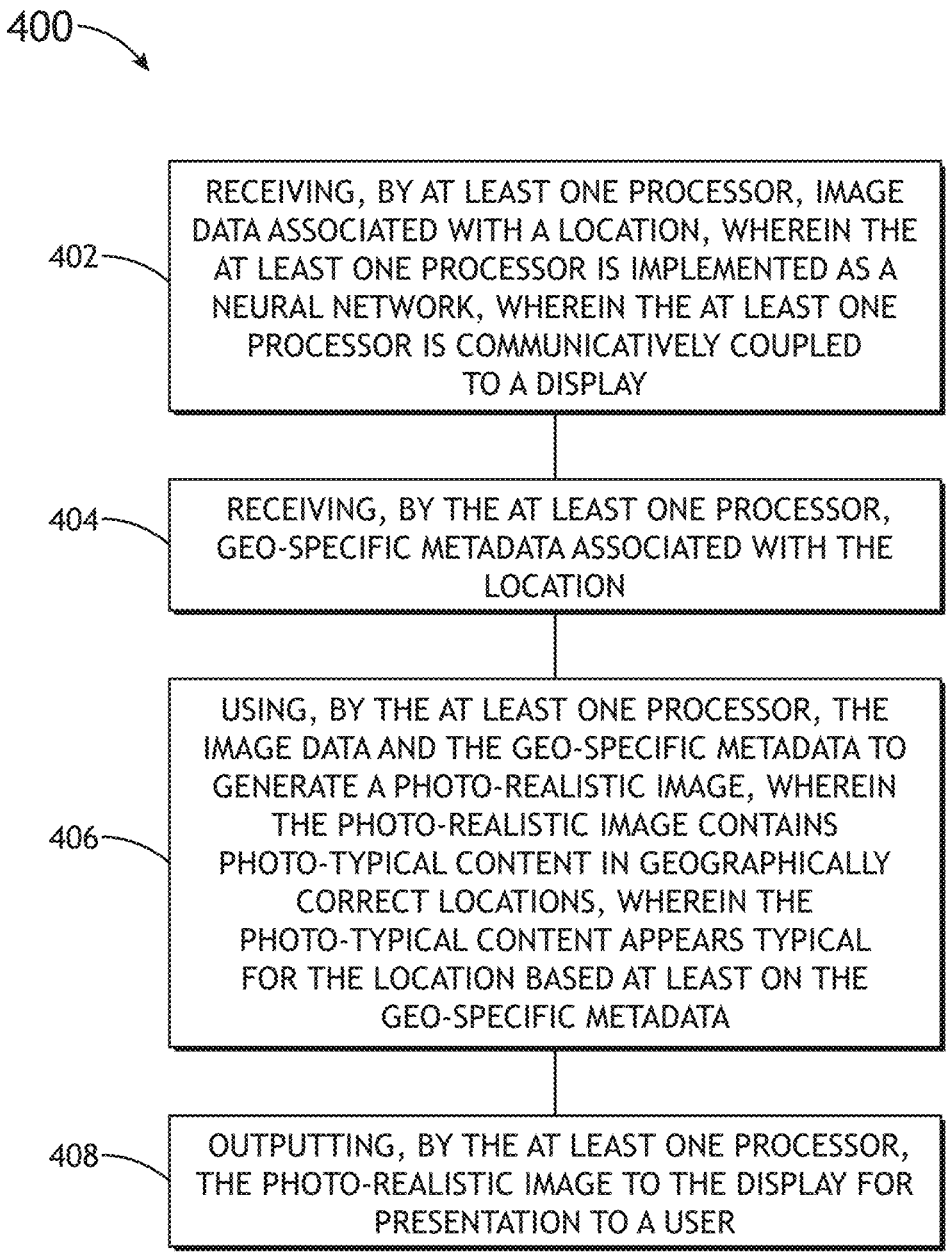
FIG. 4 is a diagram of an exemplary embodiment of a method according to the inventive concepts disclosed herein.

Referring now to FIG. 4, an exemplary embodiment of a method 400 according to the inventive concepts disclosed herein may include one or more of the following steps. Additionally, for example, some embodiments may include performing one more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially.

A step 402 may include receiving, by at least one processor, image data associated with a location, wherein the at least one processor is implemented as a neural network, wherein the at least one processor is communicatively coupled to a display.

A step 404 may include receiving, by the at least one processor, geo-specific data associated with the location.

A step 406 may include using, by the at least one processor, the image data and the geo-specific data to generate a photo-realistic image, wherein the photo-realistic image contains photo-typical content in geographically correct locations, wherein the photo-typical content appears typical for the location based at least on the geo-specific data.

A step 408 may include outputting, by the at least one processor, the photo-realistic image to the display for presentation to a user.

Further, the method 400 may include any of the operations disclosed throughout.

As will be appreciated from the above, embodiments of the inventive concepts disclosed herein may be directed to a method and a system configured to use image data and geo-specific data to generate a photo-realistic image.

As used throughout and as would be appreciated by those skilled in the art, "at least one non-transitory computer-readable medium" may refer to at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a display; and
   at least one processor communicatively coupled to the display, wherein the at least one processor is implemented as a neural network, wherein the at least one processor is configured to:
   receive image data associated with a location;
   receive geo-specific data associated with the location, wherein the geo-specific data comprises: ecological data pertaining to land type, and near-infrared data to identify foliage;
   use the image data and the geo-specific data to generate a photo-realistic image of the location, wherein the photo-realistic image contains photo-typical content in geographically correct locations, wherein the photo-typical content appears typical for the location based at least on the geo-specific data, wherein the photo-realistic image is a top-down photo-realistic image; and
   output the photo-realistic image of the location to the display for presentation to a user,
   wherein the system is an aircraft system or an aircraft simulator system.

2. The system of claim 1, wherein the neural network is a conditional generative adversarial network (cGAN).

3. The system of claim 1, wherein the neural network uses multiple channels of input data including at least one channel for the image data and at least one channel for the geo-specific data.

4. The system of claim 1, wherein the neural network includes a generator and a discriminator, wherein the generator uses the image data, the geo-specific data, and a set of weights and biases to iteratively generate an output image, wherein the discriminator iteratively generates a loss function to measure how good the generator's output image is, wherein the discriminator iteratively updates the set of weights and biases until the discriminator determines the output image to be real, wherein the output image determined to be real is the photo-realistic image.

5. The system of claim 1, wherein the geo-specific data further comprises at least one of: geographical information data, elevation data, land-use data, or target photo pixel resolution data.

6. The system of claim 1, wherein the system is the aircraft system.

7. The system of claim 1, wherein the photo-typical content includes vegetation, roads, and buildings, wherein the buildings are near and facing the roads, wherein the vegetation is off of the roads.

8. The system of claim 7, wherein the neural network is a conditional generative adversarial network (cGAN), wherein the system is the aircraft system.

9. The system of claim 8, wherein the geo-specific data further comprises: geographical information data pertaining to the roads, waterways, and the buildings, elevation data pertaining to terrain slope, and land-use data.

10. The system of claim 9, wherein the geo-specific data further comprises: target photo pixel resolution data.

11. A method, comprising:
    receiving, by at least one processor of a system, image data associated with a location, wherein the at least one processor is implemented as a neural network, wherein the at least one processor is communicatively coupled to a display of the system, wherein the system is an aircraft system or an aircraft simulator system;
    receiving, by the at least one processor, geo-specific data associated with the location, wherein the geo-specific data comprises: ecological data pertaining to land type, and near-infrared data to identify foliage;
    using, by the at least one processor, the image data and the geo-specific data to generate a photo-realistic image of the location, wherein the photo-realistic image contains photo-typical content in geographically correct locations, wherein the photo-typical content appears typical for the location based at least on the geo-specific data, wherein the photo-realistic image is a top-down photo-realistic image; and
    outputting, by the at least one processor, the photo-realistic image to the display for presentation to a user.

12. The method of claim 11, wherein the neural network is a conditional generative adversarial network (cGAN).

13. The method of claim 11, wherein the neural network uses multiple channels of input data including at least one channel for the image data and at least one channel for the geo-specific data.

14. The method of claim 11, wherein the neural network includes a generator and a discriminator, wherein the generator uses the image data, the geo-specific data, and a set of weights and biases to iteratively generate an output image, wherein the discriminator iteratively generates a loss function to measure how good the generator's output image is, wherein the discriminator iteratively updates the set of weights and biases until the discriminator determines the output image to be real, wherein the output image determined to be real is the photo-realistic image.

15. The method of claim 11, wherein the geo-specific data further comprises at least one of: geographical information data, elevation data, land-use data, or target photo pixel resolution data.

16. The method of claim 11, wherein the system is the aircraft system.

* * * * *